Sept. 8, 1931.                P. H. CRAIG                 1,822,130
                          ELECTRICAL CONVERTER
                          Filed Sept. 28, 1927
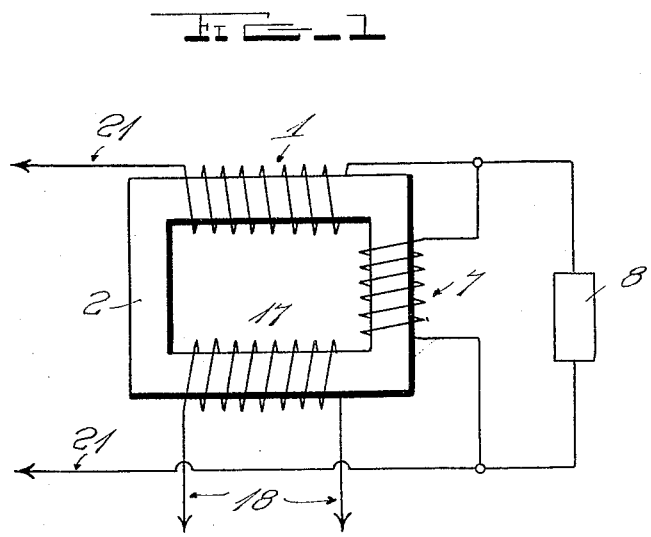
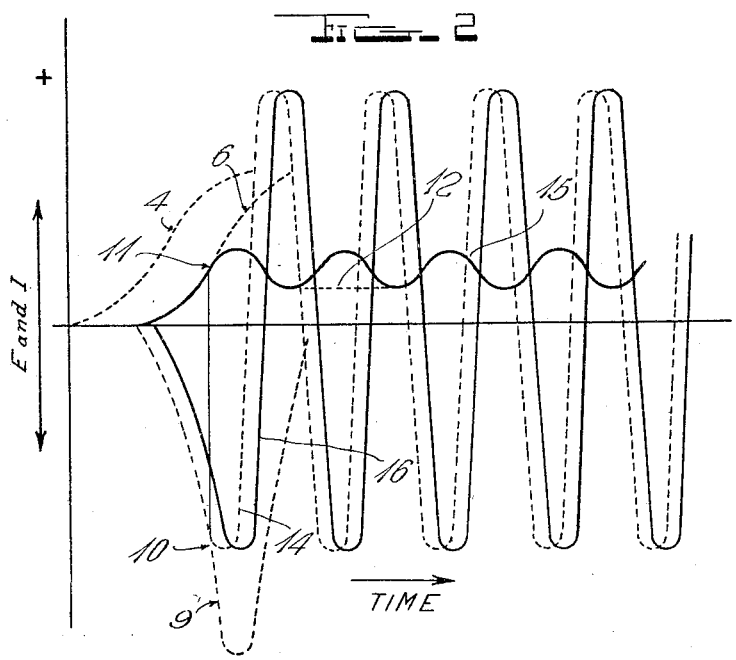
INVENTOR.
Palmer Hunt Craig,
BY
John B Brady
ATTORNEY.

Patented Sept. 8, 1931

1,822,130

UNITED STATES PATENT OFFICE

PALMER HUNT CRAIG, OF CINCINNATI, OHIO, ASSIGNOR TO INVEX CORPORATION, A CORPORATION OF NEW YORK

ELECTRICAL CONVERTER

Application filed September 28, 1927. Serial No. 222,615.

My invention relates broadly to electrical apparatus and more particularly to a converter for changing direct current into alternating current.

One of the objects of my invention is to provide a simplified construction of converter for changing direct current into alternating current.

Still another object of my invention is to provide a compact assembly of automatically controlled apparatus for modifying the effects of direct current supplied to the apparatus for the production of alternating current.

A still further object of my invention is to provide a circuit arrangement for a converter wherein means are provided for electrically controlling the supply of direct current impulses to the primary winding of a transformer system for securing at the output terminals an alternating current without the employment of mechanical switching devices.

Other and further objects of my invention reside in the circuit arrangement for the converter as set forth in the specification hereinafter following by reference to the accompanying drawings, in which:

Figure 1 diagrammatically illustrates the circuit arrangement of my invention for electrically controlling the directivity of current for producing alternating current in a secondary system without the necessity of mechanical switching devices; and Fig. 2 shows the characteristic curves of the electrical conditions in the converter system of Fig. 1.

Referring to the circuit of Fig. 1 and graph of Fig. 2, direct current is impressed upon winding 1 through conductors 21 of transformer 2 and alternating current is delivered from the output winding 17 to conductors 18. If winding 1 were the only thing in the circuit, the voltage in winding 1 would build up according to curve 4 of the graph Fig. 2. Because of the inductive reactance of the iron cored winding, however, the current would be represented by curve 6 "lagging" the E. M. F. curve by the angle $\phi$ where $\phi$ is the phase angle. However, there is connected in the line another winding 7 and a device 8, the latter two being in parallel, as shown. Device 8 is one which will only pass a current when certain impressed voltages are present. Thus, I have used cuprous oxide rectifiers such as the "Rectrox" of Westinghouse Electric and Manufacturing Company, and "Kuprox" of Kodel Radio Corporation, which rectifiers possess the remarkable property of being unable to pass any appreciable current when the voltage applied across them is less than some given value. They do not obey Ohm's law on this range, but instead they suddenly cease to pass current when the voltage across them is reduced to less than their "critical" value. This critical voltage varies with different types of rectifiers, of course, being as high as 200 volts in the case of neon tubes and as low as a fraction of a volt in the case of certain paste rectifiers. neon tubes have been employed for the "interrupter" 8, and I have also used helium-argon, etc., filled tubes such as the "Raytheon" tubes. Further, I have employed an arc lamp where the arc was not maintained at lower voltages than a certain E. M. F. The arc may be the familiar carbon form or a glass-enclosed and evacuated form such as the Edison "Pointolite".

The windings 1 and 7 are so designed that winding 7 usually has more turns than winding 1, with a correspondingly higher impedance. Winding 7 is so connected to interrupter 8 that a changing flux produced in the core due to current starting to flow through winding 1 will induce a voltage in winding 7 in such a direction as to "buck" or oppose the existing voltage across 8 with the result that the induced voltage in 7 operates to lower the effective or net E. M. F. across 8.

Direct current is applied to the system through conductors 21, and current tends to build up in winding 1 according to curve 6 of the graph. However, the flux in the core of the transformer 2 will be in phase with the current through the windings and consequently the flux will be increased momentarily also according to curve 6. This increase of flux, however, induces a voltage in winding 7 according to curve 9. When this induced voltage 9 reaches a certain value, which may be represented at 10, it has applied enough "back" E. M. F. to device 8 to cause the device 8 to stop passing current. Previous to this time, practically no current from the direct current source 21 has passed through winding 7 because the impedance of 8 was much lower than that of 7. Now, however, since the net voltage across 8 has been reduced to a lower value than its critical potential, the circuit can be considered as opened at 8, which fact compels the current to pass through winding 7. Graphically this action is illustrated by the fact that curve 6 instead of continuing upward as indicated, "breaks" at point 11 and returns to level 12 which is the direct current level of current through windings 1 and 7 in series, due to the high impedance of winding 7. This variation of current in winding 1, however, causes the induced voltage of winding 7 to approximate curve 14 instead of dotted curve 9 which it would have followed had the current in 1 continued on curve 6. Now when equilibrium has again been momentarily reached the current has built up to value 12 in coils 1 and 7. This current through coil 7 however, produces such a large R I drop across 7, the resistance of winding 7 being relatively large, that the effect of impressing R I drop or E. M. F. on 8 is to cause 8 to begin to pass current again, whereupon the complete operation is repeated and continuous fluctuations of the current in 1 occur according to curve 15, the result being that curve 14 continues as shown and the current in 7 varies as shown by curve 6. Thus there are two fluxes set up in the core of transformer 2 either of which may be used to induce voltage and current in the alternating current output coil 17 or a separate transformer may be employed, the primary of which is in series with windings 7 or 1. The alternating current output conductors 18 are connected to the winding 17 as shown.

Thus a system is provided for converting direct current to alternating current of either one or both of two frequencies (one double that of the other); also a method for interrupting a direct current without moving parts and without switching or arcing of any kind and a method for producing sustained oscillations in this circuit.

While I have described my invention in certain of its preferred embodiments I desire that it be understood that modifications may be made and that no limitations upon my invention are intended other than are imposed by the scope of the appended claims.

What I claim as new and desire to secure by Letters Patent of the United States is as follows:

1. In an apparatus for converting direct current into alternating current, a transformer system having a multiplicity of primary windings and a secondary winding, said primary windings being connected in series and means connected in shunt with one of said primary windings for intermittently supplying direct current impulses to said primary winding, for producing alternating current in said secondary winding.

2. An electrical converter for changing direct current into alternating current comprising a transformer system having a multiplicity of primary windings and a secondary winding, a direct current supply circuit, an alternating current work circuit connected with said secondary winding, and connections between said primary windings and said direct current supply circuit, and means disposed in shunt with one of said primary windings in said direct current supply circuit for intermittently and successively modifying the current impulses in said primary windings for producing an alternating current in said secondary winding.

3. An electrical converter for changing direct current into alternating current comprising a transformer system having a multiplicity of primary windings and a secondary winding, an alternating current work circuit connected with said secondary winding, a direct current supply circuit connected with said primary windings, and means disposed in shunt with one of said primary windings in said direct current supply circuit for alternately energizing selected ones of said primary windings with direct current impulses for producing an alternating current in said secondary winding.

4. In an electrical converter for changing direct current into alternating current comprising a transformer system having a secondary winding and a pair of primary windings, an alternating current work circuit connected with said secondary winding, a direct current supply circuit connected with said primary windings in series, and means connected in shunt with one of said primary windings for controlling the character of energy therein whereby an alternating current is produced in said secondary winding.

5. In an electrical converter for changing direct current into alternating current comprising a transformer system having a secondary winding and a pair of primary windings, an alternating current work circuit connected with said secondary winding, a direct current supply circuit connected with said primary windings in series, and a device connected in parallel with one of said windings and having variable conditions of conductivity above and below a critical value of current delivered by said direct current supply circuit for modifying the effect of the parallel connected primary winding upon said secondary winding in cooperative relation with said other primary winding whereby an alternating current is produced in said secondary winding.

6. An electrical converter comprising an iron core member, a pair of primary windings disposed on said core member, one of said windings having a higher impedance than the other, means connected in shunt with said higher impedance winding electrically conductive for values of current above a predetermined value and nonconductive below said predetermined value, and a secondary winding on said core member, said primary windings interacting upon each other under control of said means for passing periodic pulses of current for generating an alternating current in said secondary winding.

In testimony whereof I affix my signature.

PALMER HUNT CRAIG.